Oct. 18, 1949.  A. P. STUHRMAN ET AL  2,485,331
APPARATUS FOR TRAINING AIRCRAFT PERSONNEL
IN RADIO NAVIGATION

Filed Nov. 25, 1939  9 Sheets-Sheet 1

FIG. 1.

INVENTORS.
Ahlert P. Stuhrman
Charles W. McKee
BY Lancaste, Allwine Rommel
ATTORNEYS.

Oct. 18, 1949.

A. P. STUHRMAN ET AL 2,485,331

APPARATUS FOR TRAINING AIRCRAFT PERSONNEL
IN RADIO NAVIGATION

Filed Nov. 25, 1939

INVENTORS.
Ahlert P. Stuhrman
Charles W. McKee

BY Lancaster, Alwine Rommel
ATTORNEYS.

Oct. 18, 1949.  A. P. STUHRMAN ET AL  2,485,331
APPARATUS FOR TRAINING AIRCRAFT PERSONNEL
IN RADIO NAVIGATION
Filed Nov. 25, 1939  9 Sheets-Sheet 5

INVENTORS.
Ahlert P. Stuhrman
Charles W. McKee
ATTORNEYS.

INVENTORS
Ahlert P. Stuhrman
Charles W. McKee
BY
ATTORNEYS.

Patented Oct. 18, 1949

2,485,331

UNITED STATES PATENT OFFICE 2,485,331

APPARATUS FOR TRAINING AIRCRAFT PERSONNEL IN RADIO NAVIGATION

Ahlert P. Stuhrman, Miami, and Charles W. McKee, Hialeah, Fla., assignors, by mesne assignments, to Link Aviation, Inc., a corporation of New York Application November 25, 1939, Serial No. 306,188

11 Claims. (Cl. 35—10)

This invention relates to improvements in methods and apparatus for teaching the art of radio and instrument flying while on the ground.

The primary object of the invention is the provision of improved electrical means associated with an aircraft training device for instructing pilots and student aviators the art of blind flight.

A further object of this invention is the provision of improved means associated with an aviation trainer, commonly known as the "Link instrument and radio pilot trainer," such as is detailed, as to structural features, in U. S. Patents #1,825,462; 2,099,857, and 2,119,083, but embodying improved means thereover for training students and other pilots the art of radio navigation.

A further object of the invention relates to improved electrical signalling apparatus associated with ground aircraft training apparatus, for determining bearings from an unknown position to a given transmitting station or to more than one transmitting station; the resulting knowledge enabling the aerial navigator to determine his exact location and proceed to a given point for landing.

A further object of the invention is the provision of improved apparatus associated with a ground trainer, such as is set forth in U. S. Patents 1,825,462 and 2,099,857 for instructing ground personnel in the art of radio navigation and radio direction finding.

A further object of this invention is the provision of improved electrical signalling apparatus adapted for installation upon aircraft ground trainers, such as the "Link" trainer, wherein the instruments employed simulate those of an actual radio direction finder, thus enabling the student to become skilled in radio direction finding.

A further object of this invention is the provision of improved apparatus adapted for association with ground training apparatus which operates, so far as the student or pilot is concerned, identically the same as a looped direction finder on aircraft in flight; the apparatus including an instructor's unit which will enable the instructor to present various problems to the pilot for solution, and visually understand the pilot's response thereto.

A further object of this invention is the provision of an improved artificial radio direction finder adapted for association with ground training apparatus, such as that known as the "Link" trainer; the same including an azimuth indicator for the pilot and a complementary unit for the instructor outside of the trainer; the azimuth indicator and instructor's unit having associated therewith electrical signalling apparatus which will enable the instructor to present to the pilot various problems for solution, such as station finding, positioning location, and other radio navigation problems; the instructor's unit having means for automatic operation so that the course theoretically pursued by the pilot may be recorded on a chart or range finding map.

A further object of this invention is the provision of an improved attachment adapted to be associated with a flight log or automatic recorder of the "Link trainer type," which renders the flight course scale of the automatic recorder automatic in operation.

Other objects and advantages of this invention will be apparent during the course of the following detailed description.

In the accompanying drawings, forming a part of this specification, and wherein similar reference characters designate corresponding parts throughout the several views.

In the drawings, wherein for the purpose of illustration is shown only a preferred embodiment of the invention, the letter A may generally designate a ground trainer, such as the "Link" type, with which is associated an automatic recorder or flight log device; the same being well known in construction, except for improved features to be hereinafter described, and operating to trace the theoretical flight course of the pilot within the trainer.

The trainer A, as above mentioned, is described in detail in such U. S. patents as 1,825,462 and 2,099,857, although it is to be understood that the loop direction finding characteristics of this invention are applicable to other training devices.

The trainer A, as is well known, includes a stationary base 20 on which the fuselage 21 is mounted. The latter has a universal joint mounting or mechanism in the base so that it can rotate through 360°, comparable to the yawning motion of an airplane. The motions of the trainer, as is well known, are obtained by use of reduced air pressure or partial vacuum and operate various bellows for the purpose of moving the trainer to simulate pitch, climb, bank or roll, and turning or yawning. Air control of the operating mechanism provides a variable power source which is controlled entirely by the stick and rudder within the fuselage through valve mechanisms which create motion of the fuselage about the three axes of the trainer, in exact simulation of aircraft flight movement.

The flight log or automatic recorder B, so far as conventional features are concerned is generally of the nature set forth in U. S. Patent #2,179,663, and includes upper and lower triangular platform plates 25 and 26 suitably connected together in spaced relation. They are mounted upon a pair of driving wheels 27, and a third wheel 28 known as the tracer wheel, which is mounted on the lower end of a rotatable shaft 29. The instrument travels on these three wheels, which are all connected together by gearing 30 between the plates 25 and 26, so that directional control is effective with all three wheels at the same time from one master synchronous reversible motor. Power is supplied for driving forward by two constant speed synchronous motors connected to the two driving wheels 27. The third wheel 28 is of course an idler wheel and supplied with an ink roller 31 for marking on the chart the theoretical course of the trainer.

The automatic recorder synchronous motor is an "autosyn" motor. The other "autosyn" motor which directs the motion or rotation of the automatic recorder motor is located in the base of the trainer A. Rotation of the fuselage 21 rotates the column which in turn rotates the "autosyn" motor of the trainer through a gear train. The "autosyn" motor of the recorder is connected electrically to the "autosyn" motor of the trainer so that any rotation of the "autosyn" motor of the trainer will cause a corresponding rotation of the "autosyn" motor on the recorder. The gear mechanism of the recorder is such that any movement of the wheel controlled by the recorder motor causes a corresponding movement of the other two wheels by means of three gears of equal diameter meshed with a common gear to which the "autosyn" motor of the recorder is attached. Gear reduction makes possible several settings of the automatic recorder, but relative movement is always constant. The automatic recorder does not turn. The driving wheels 27 and also the tracer wheel 28 turn to give directive travel to the recorder across a map. These are of course all conventional features and will be understood by those skilled in the art to which this invention relates.

Figure 2:
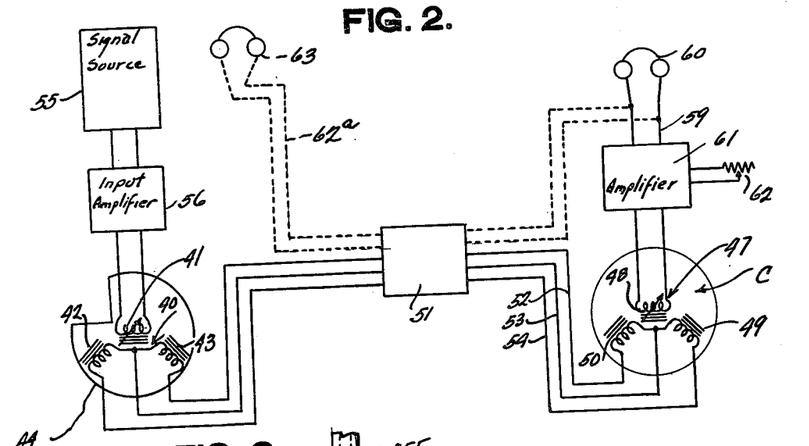
Figure 2 is a diagrammatic representation of the basic circuit and electrical apparatus associated with our invention and with the "Link" adaptation circuit diagram.
Figures 3, 4, 5:
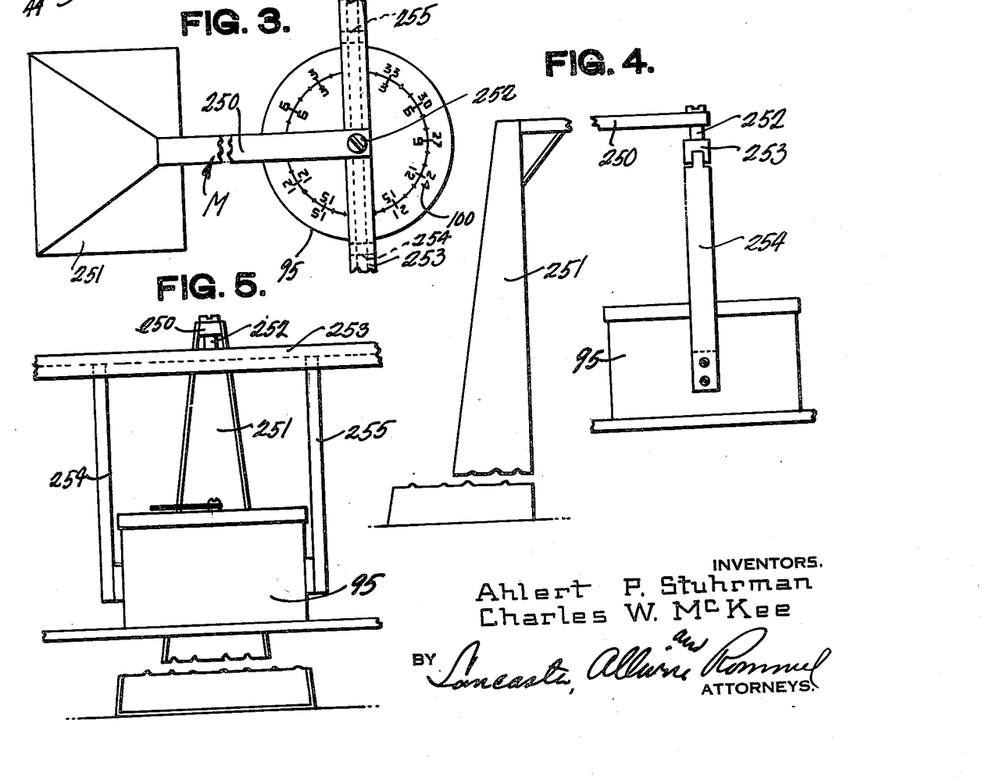
Figures 3, 4, and 5 are fragmentary views of improved means for rendering the flight course scale of the automatic recorder fully automatic in operation; that is, the instructor does not have to reset the flight course scale in response to changes in position by the pilot.

Referring to the basic circuit diagram of our invention, as shown in Figure 2 of the drawings, two variable coupling transformers are provided, one on the automatic recorder of the instructor's unit, and the other in association with the azimuth indicator C under control of the pilot in the fuselage of the trainer. These transformers are connected to each other by wiring; the idea being that of conveying signal voltage from one transformer to the other.

The automatic recorder transformer 40, designated in Figure 2, is made up of three coils 41, 42, and 43; the coils 42 and 43 being mounted in an angular relation of 90°, with respect to the fixed point at a given radius whereat the coil 41 is mounted. This coil 41, as will hereinafter be detailed, is mounted to rotate on its own axis, which is the common point of intersection of the axes of the other coils 42 and 43. The coils 42 and 43 are mounted on a rotatable base 44 as will be hereinafter described.

The transformer 47 forming part of the azimuth indicator C consists of coils 48, 49 and 50. Coils 49 and 50 are rigidly mounted to a panel of the azimuth indicator C, but the coil 48 is attached to the main shaft of the azimuth indicator and turns therewith as will be subsequently described. Coils 49 and 50 are disposed with their axes at an angle of 90° with respect to each other, and the intersecting point of these axes is the point of rotation of the coil 48. It is preferred that the spacing and size of the coils of the two transformers be identical.

In the wiring diagram shown in Figure 2, 51 designates the various terminal blocks, contacts, cables, etc. to be subsequently described in detailing the construction and installation of the unit in the azimuth indicator and automatic recorder. As shown in Figure 2 the coils 42 and 43 of the transformer 40 are connected to the coils 49 and 50 by means of three wires 52, 53, and 54; the common lead wire 53 making only three wires necessary to connect the two sets of coils. The coil 41 of the automatic recorder transformer is connected by wiring to the standard radio range signalling device designated at 55 in the drawings, which may be any type of oscillator, or any other approved signal source. This signalling source 55 is known in the Link trainer as the "Link radio range control unit and amplifier."

The wiring may have a D. F. amplifier 56 therein.

The coil 48 of the transformer unit 47 associated with the azimuth indicator is connected by wiring 59 with the headset 60 of the pilot, and the wiring may have a trainer D. F. amplifier 61 located therein, with suitable volume control 62. The dotted lines 62ª shown in Figure 2 of the drawings designate wiring which may be connected between the instructor's monitoring headset 63 and the student headset 60.

In operation, the coil 48 picks up signal voltage through the transformer 47 when the coil 41 of the transformer 40 is excited. The same signal level is obtained by the coil 48 as transmitted by the coil 41 because the coils are in the same relative position in both transformer units. The magnitude of induced voltage is measured by the angle of the axis of the coil 41 with respect to the coils 42 and 43. Voltages in coils 42 and 43 have a definite phase relation with respect to each other and with respect to the voltage in the coil 41; the voltages in these coils 42 and 43 being reproduced across the coils 49 and 50. Of course any change in the voltage relation of coils 42 and 43 will likewise produce a corresponding change in coils 49 and 50. Thus, any change in the relative position of coil 41 with respect to the coils 42 and 43 will result in a corresponding change in voltage in the coil 48.

In direction finding work it is desirable, and considered more accurate, particularly for aural detection, to observe the null or zero signal point. This condition is obtained by movement of the coil 48 through an angle of 90° from the position of maximum response. In this position the currents from coils 49 and 50 produce voltages in coil 48 which are opposite in phase and hence cancelled. Of course the magnitude of this voltage is controlled by the relative position that the coil 41 bears to the coils 42 and 43.

Figure 6:
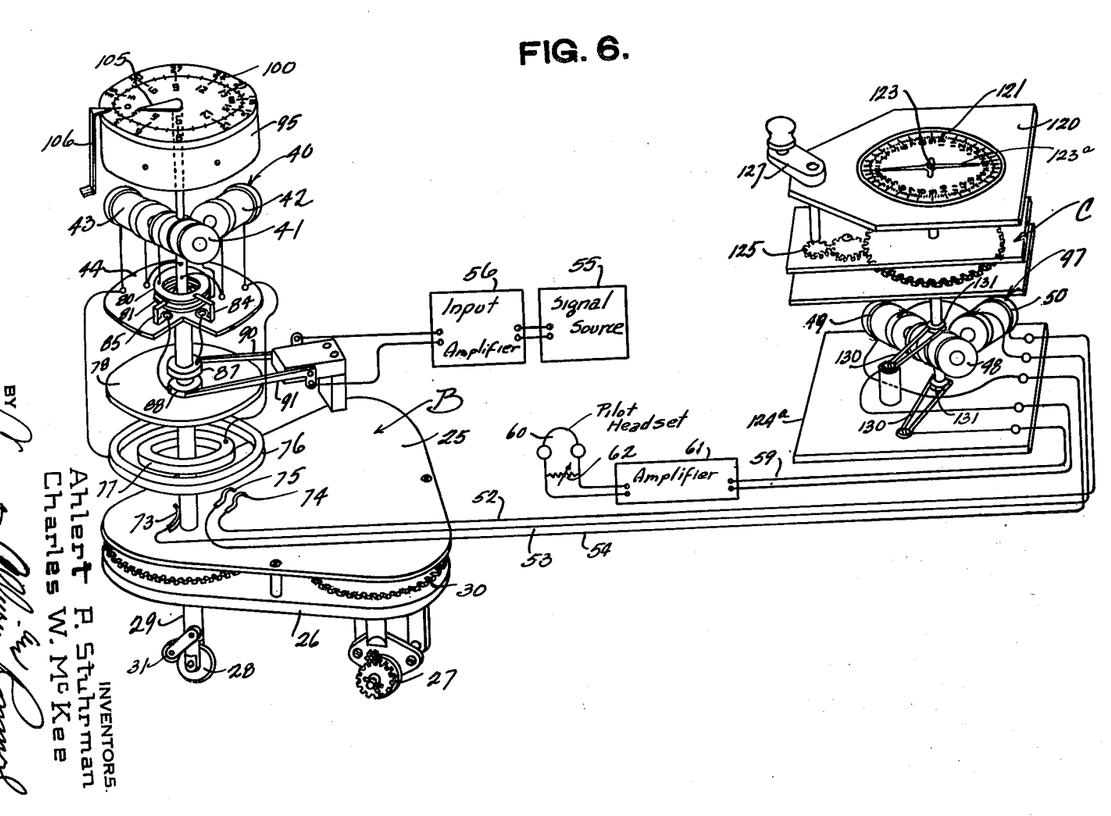
Figure 6 is a perspective view, partly diagrammatic, showing the cooperative pilot controlled azimuth indicator and the instructor's automatic recorder, with the improved electrical signalling apparatus of our invention associated with these two units.
Figure 12:
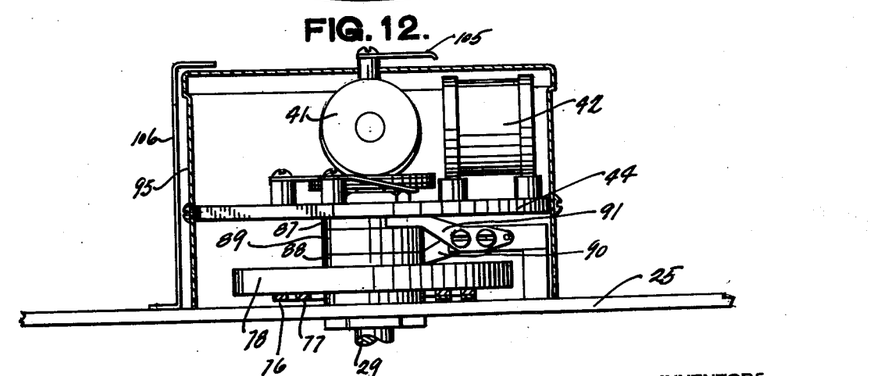
Figure 12 is a vertical sectional view taken through the flight course scale of the automatic recorder, and showing improved features of this invention associated therewith, particularly the transformer coils and associated contacts.
Figure 13:
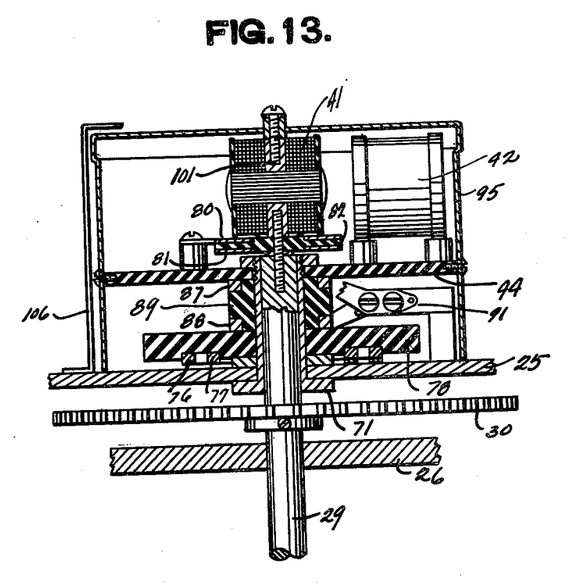
Figure 13 is a vertical sectional view taken thru the transformer coil arrangement of the automatic recorder along the axis of the tracer wheel shaft.

Referring to the transformer mounting and operation, as applied to the automatic recorder, the tracer wheel 28 of the automatic recorder is mounted on a shaft 29 which is rotatably mounted in the frame 25 of the automatic recorder. The coils 42 and 43, as best illustrated in Figures 12 and 13 of the drawings, are rigidly attached to a Bakelite base 44 which is mounted upon and attached to a bearing sleeve or bushing 71, so that the said platform or base 44 may rotate about the shaft 29, as can be understood from Figure 13 of the drawings. As is shown in Figure 6 of the drawings the common lead wire 53 has a contact connection 73 with the shaft 29, which is at ground potential. The other lead wires 52 and 54 are provided with contacts 74 and 75 respectively mounted on the automatic recorder platform 25 and in conducting engagement with slip rings 76 and 77 respectively; the latter being mounted on the bottom of a Bakelite or other insulation disc 78 which rotates with the bushing 71 to which the coil platform 44 is attached. The slip rings 76 and 77 are respectively wired with the coils 43 and 42, as is shown in Figure 6 of the drawings and the said coils have a ground connection upon the shaft 29, as has been described, for the basic circuit shown in Figure 2 of the drawings. The opposite ends of the coil 41 are connected to slip rings 80 and 81, which are on the upper and lower surfaces of an insulation base mounting 82 for the coil 41, as shown in Figure 13 of the drawings; suitable contacts 84 and 85 being provided for these slip rings 80 and 81 which are respectively wired to contact rings 87 and 88; the latter being mounted on the insulation bushing 89 attached between the insulation discs 44 and 78, and rotatable therewith around the shaft 29. Conductor arms 90 and 91 are in engagement with the slip rings 87 and 88 respectively, and lead wires extend therefrom to the input amplifier 56 of the radio range signal source, as is shown in the basic diagram of Figure 2 and also in Figure 6.

The automatic recorder includes an inverted cap or cover 95, of any approved material which is attached to the platform 44 for rotation with the coils 42 and 43, as shown in Figures 12 and 13 of the drawings, cover 95 has the flight course scale 100 indicated thereon, as shown in Figure 6, and various other figures of the drawings. As before mentioned, the coil 41 is attached to the tracer wheel shaft 29, and the mode of attachment is indicated in Figure 13 of the drawings at 101; an extension of the shaft through the coil 41 having a flight course scale pointer 105 mounted thereon and operative over the flight course scale 100. A reference pointer 106 is mounted on the frame 25 of the automatic recorder relative to the flight course scale 100, as is shown in various figures of the drawings. It is of course understood that the bushing 71 rotates about the shaft 29 and that the insulation discs and rings 44, 78 and 89 are clamped thereto and rotate with the bushing, as shown in Figure 13.

Figure 1:
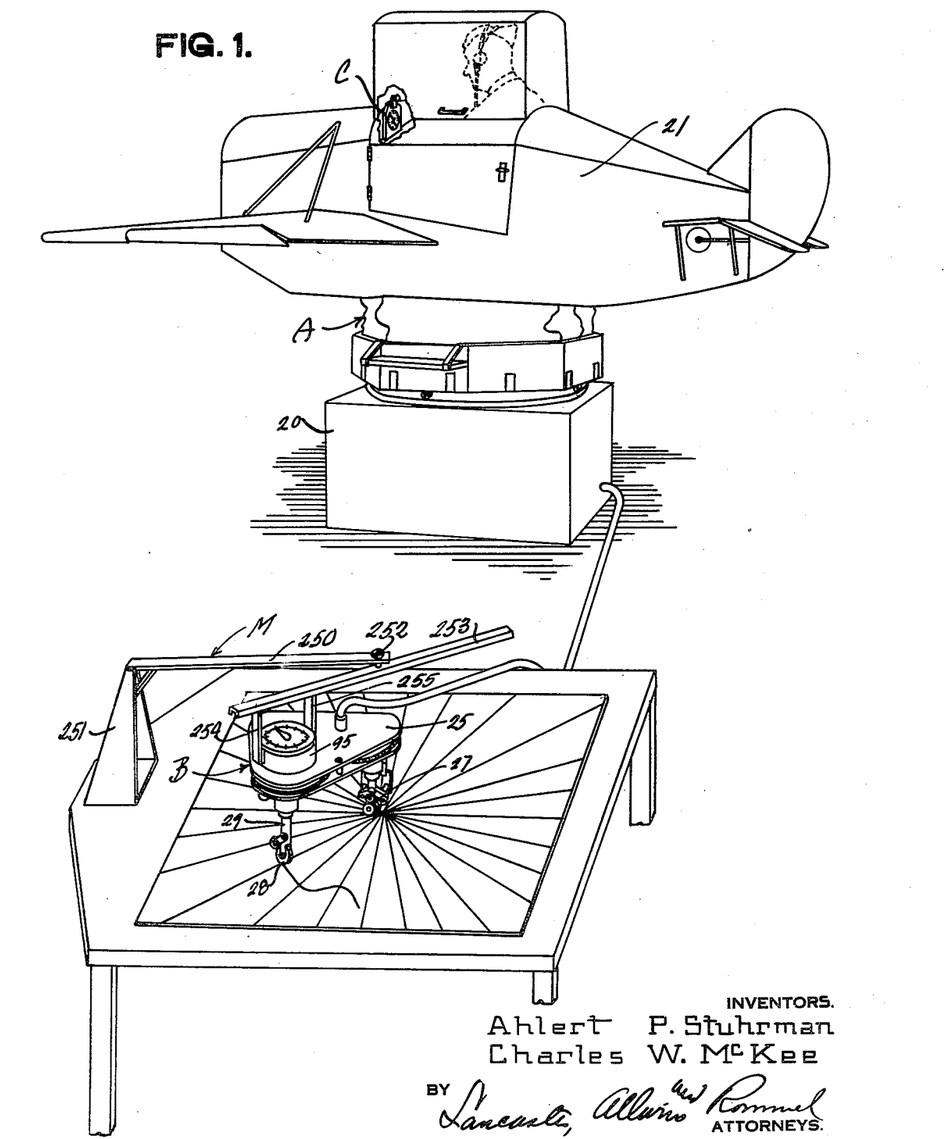
Figure 1 shows student and pilot ground aircraft training apparatus including a pilot trainer and automatic recorder in which our improved invention is installed.
Figure 7:
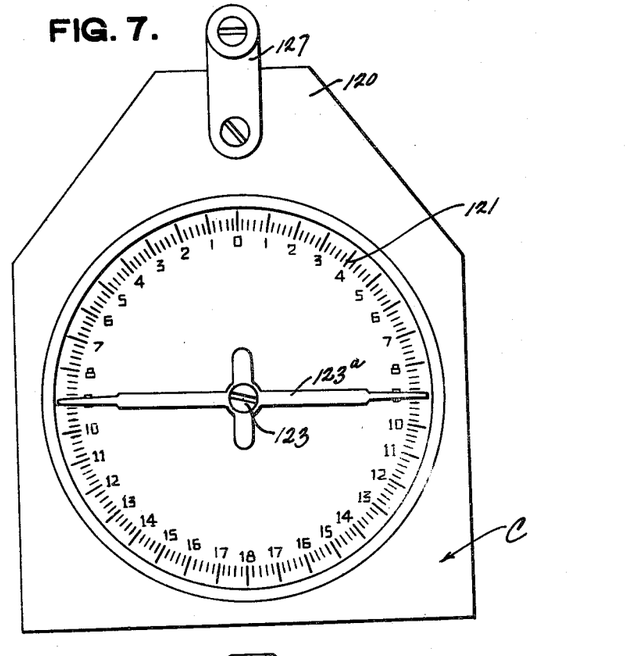
Figure 7 is a front elevation of the azimuth indicator.
Figure 8:
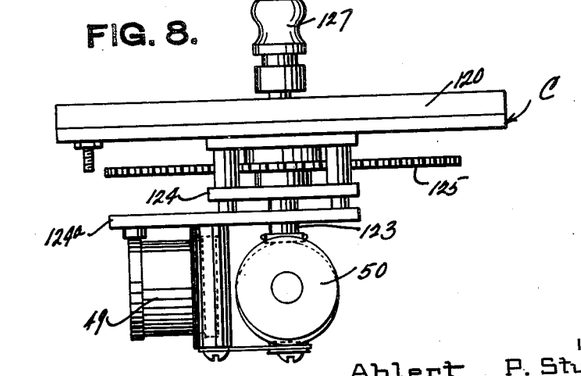
Figure 8 is a side view of the azimuth indicator with the improved features of our invention associated therewith.
Figure 9:
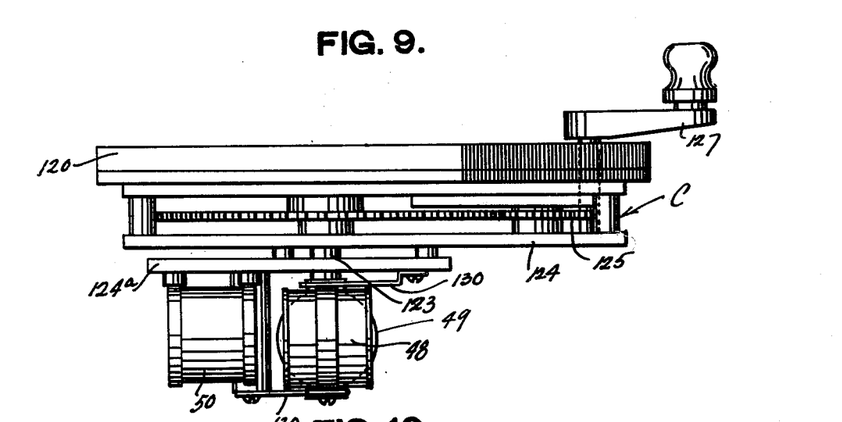
Figure 9 is a side elevation of the improved azimuth indicator.
Figure 10:
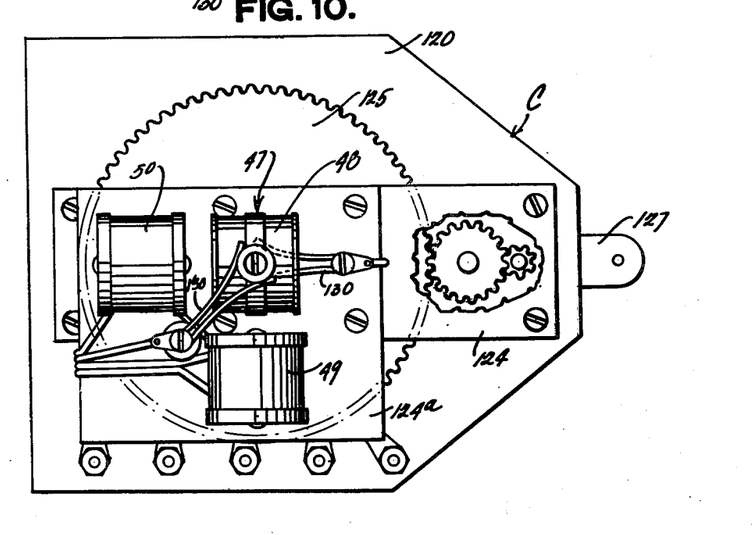
Figure 10 is a bottom plan view of the improved azimuth indicator.
Figure 11:
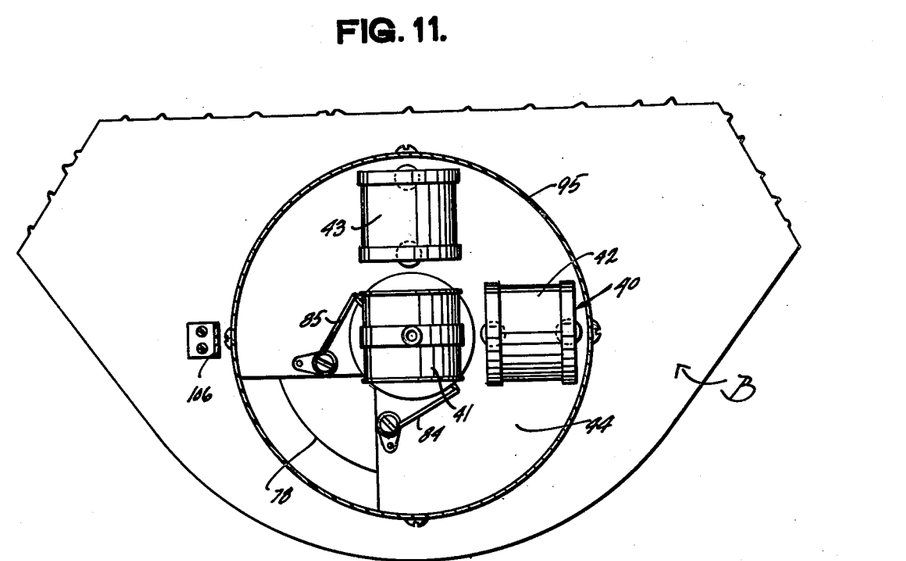
Figure 11 is a cross sectional view taken through the automatic recording device showing more particularly the coil arrangement of a variable coupling transformer which is used in connection with the improved electrical signalling apparatus of this invention.

The azimuth indicator C is of unusual construction, insofar as the radio loop signal circuit is concerned, since it has the coils of the pilot transformer set associated directly therewith. It includes a panel 120 on which the azimuth scale 121 is delineated. The coil 48 of the transformer unit 47 is rotatably mounted by means of a shaft 123 on the framework 124 below the panel. The shaft 123 is connected by reduction gearing 125 with a manually controllable crank 127 which is mounted on the front of the panel 120 as is indicated in Figures 7, 8, and 9 of the drawings. A platform 124ª attached as part of the framework beneath the panel 120, has the coils 49 and 50 fixedly attached thereto, and it is of course understood that the panel 120 is mounted on the fuselage of the trainer. It may be mounted vertically in front of the pilot, as indicated in Figure 1 of the drawings, although the location and position of the azimuth indicator frame is optional. The wiring of the coils 48, 49, and 50 is indicated in Figures 2, 6, and 10 of the drawings, and it is indicated in the latter two figures that the opposite ends of the wiring in the coil 48 are connected by means of terminals 130 with suitable slip rings 131; the wires leading from the terminals 130 as indicated at 59 in the drawings to an amplifier and the headset of the student.

Before detailing the method of solving range finding problems it will be well to bear in mind that the student pilot in the trainer operates the azimuth indicator in the same manner as in actual flight. The circuit and bearings are set up by the instructor and controlled by him. Bearings may be taken through the full 360° without the use of reciprocal bearings and without having to reverse rotation of the indicator. Stops may be installed to duplicate an actual installation, and the 180° ambiguity exists as an all standard loop circuit.

The circuit operates on audio frequency, although radio frequencies may be used. The signal received by the student is subject to variation in intensity with rotation of the loop or the trainer in the same manner as the loop circuit in actual plane installation. The signal input is varied through movement of the trainer because movement of the latter will cause the coil 41 of the transformer to move with shaft 29, thus changing the signal input to the windings of the transformers. This condition corresponds to homing in actual plane operation. Of course rotation of the flight course scale 95 will cause a change in the null point.

As an example of operation, assume that a radio direction finding problem is being set up for these conditions. The trainer is headed east (magnetic compass 90°). The position of the trainer is due south of the radio station 180°. The automatic recorder is placed on the map directly south of the radio range station. The coils 42 and 43 of the automatic recorder transformer are set to the correct position by rotating the flight course scale casing 95 so that the north 0° is indicated by the reference pointer 106. The pilot takes a bearing on the azimuth indicator which shows 90° to the left. Subtracted from the magnetic compass heading will give 0° north. The student then turns the trainer 90° left from its east heading and the bearing is taken. The reading on the azimuth indicator will be 0°.

Figure 14:
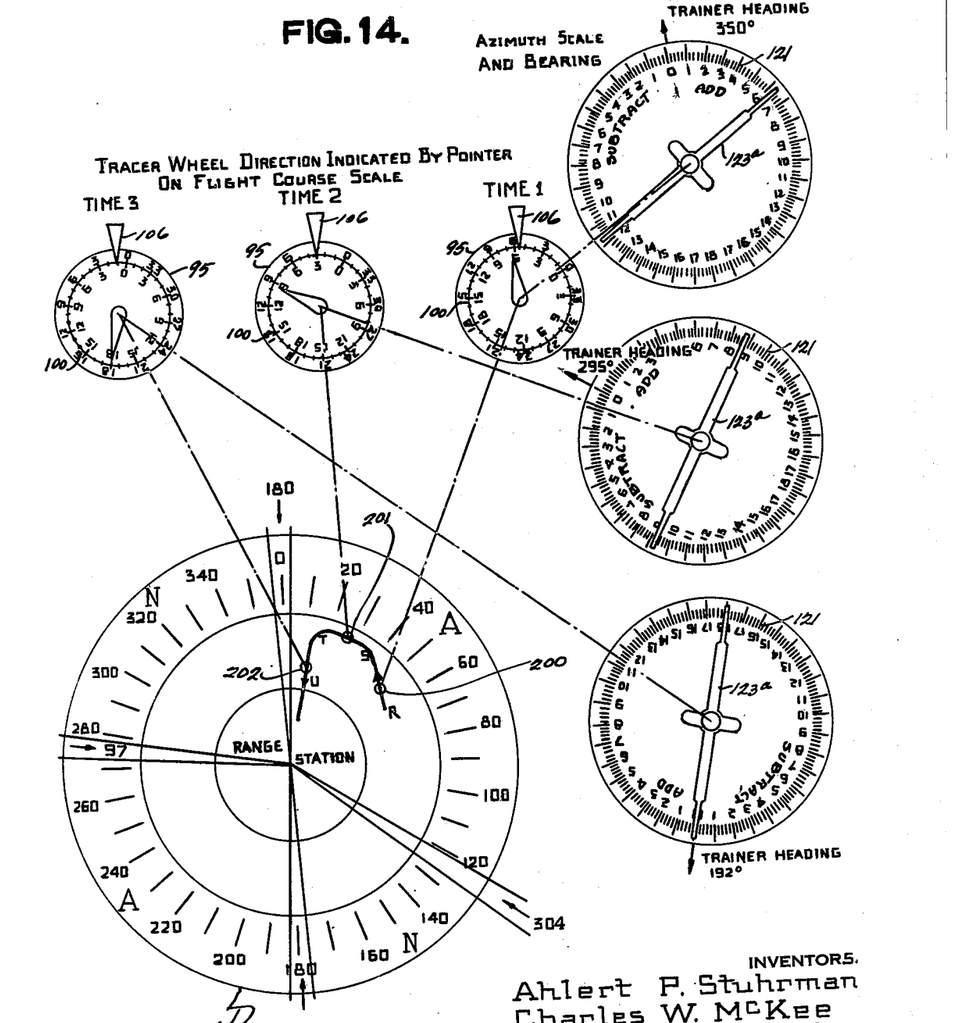
Figure 14 is a diagrammatic representation of a problem set-up, showing the complementary azimuth scale and flight course scale readings in association with the plotted theoretical course of the pilot on a radio range chart or map.

Referring to the problem set up in Figure 14 the radio range map is indicated at D, and the flight course scale and azimuth readings are indicated for the various bearing conditions by means of dot and dash lines.

The radio range map shows the courses and quadrant, and the line RSTU represent the path traced by the automatic recording wheel 28. The path begins at R and ends past U. The three points are indicated by circles in this path RSTU where bearings were taken, and it will be noted that the dot and dash lines lead from these points of bearing to the various respective readings of the flight course and azimuth indicator scales.

In the solution of this problem the automatic recorder was placed on the map D at approximately 60°. The heading of the trainer as indicated by the arrow was 350°, and of course the automatic recorder was automatically moved on a course of 350° at a predetermined rate. At the point R a bearing was of course taken. Prior to taking this bearing the instructor set the flight course scale in the proper manner, which of course consisted in moving the flight course scale with reference to the pointer 106 so as to read correctly according to the position at which the bearing is taken. Of course the instructor must at all times move the flight course scale casing 95 so as to correct the reading thereon as determined by the extension of the radial degree lines on the radio range map. As will be subsequently described the setting of the flight course scale casing 95 may be rendered automatic.

Continuing with a description of the problem set up in Figure 14 a bearing is taken at the location 200 on the radio range map, and the tracer wheel is of course located on the extension of 52°, as the map shows. The flight course scale 100, as shown with the heading "Time 1" is set by the instructor with reference to the fixed pointer 106 so that it reads 52°. This is of course determined by the location of the tracer wheel 28 on the radio range map, since its positioning is automatic according to the position which the student pilot has moved it. The heading of the trainer A at this instant is 350°. The pilot in the trainer takes a bearing at instant giving a resulting 118°, or 62°, as the azimuth indicator scale shows. The pilot at this instant must consider the station in either direction. The pilot may then make a left turn, which he does at the location S on the course shown on the radio map, of 55°, and the instructor continues to correct the flight course scale as indicated by the position of the tracer wheel on the radial degree lines of the range map. At the location 201 a second bearing is taken. The instructor has corrected the flight course scale at this location of the tracer wheel to read 28°. The heading of the trainer is 295°, and the bearing observed by the pilot on the azimuth scale for this "Time 2" is 92° or 88°. The pilot has observed that after the turn at S the "subtract" side of the azimuth scale reading has decreased while the "add" side of the azimuth reading has increased, indicating to him that the station is at the left. The pilot then subtracts 92° from the trainer heading of 295° which gives him a course to the radio range station on the radio range map of 203°. He makes this turn as indicated at T, and after the turn has been made and the line of flight has been set a bearing is taken at the location 202 to correct for inaccuracy in the bearing or course because of the turn. The bearing taken at 202, after the instructor has set the flight course scale in proper position, as indicated at "Time 3" shows on the azimuth scale a reading of 0°. This is a homing position and of course indicates to the student pilot that the trainer is headed directly for the radio range station.

As before explained the student pilot is able to obtain a correct reading on the azimuth indicator scale by obtaining the null point as determined by the position of the coils in the variable coupling transformers of the improved circuit above described.

In solving the problem set up in Figure 14 another procedure could have been followed. With the azimuth indicator scale set at 0, the pilot could have turned the trainer until a null was obtained in the signal circuit. The trainer would then be headed for the station or away from the station. A 90° turn would have indicated to the pilot the direction of the station and then the course to the station determined and the trainer turned and theoretically flown over the station.

Figure 15:
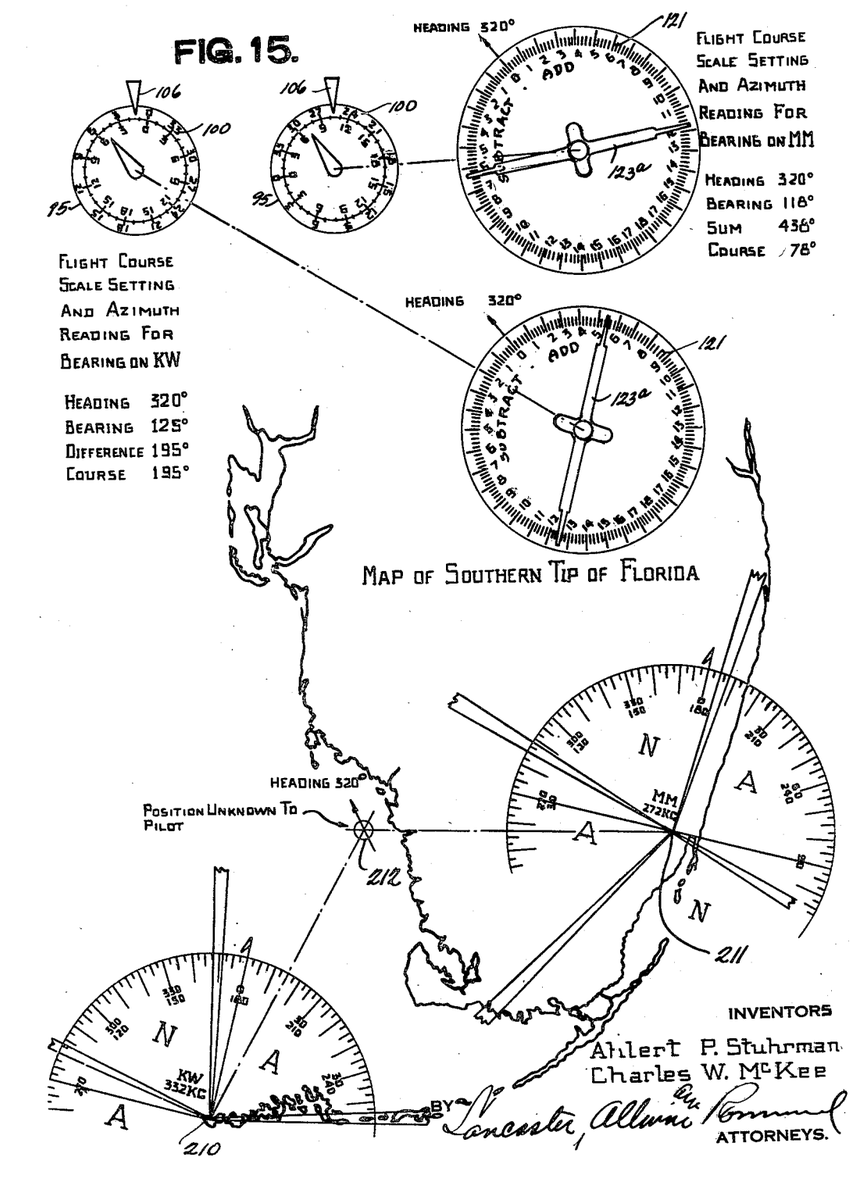
Figure 15 shows a second problem set-up with the complementary readings of the azimuth scale and flight course scale in relation to radio range charts designating two radio range stations.

Referring to the problem set-up illustrated in Figure 15, a map is set up for the determination of fixes from two stations indicated at 210 and 211. The coast line shown on the map is that of Florida.

The automatic recorder tracer wheel is set at a location designated in Figure 15 as 212. This location is unknown to the pilot and is off the southwest coast of Florida. The trainer is headed in the direction indicated by the arrow at this location at an angle of 320°. The problem for solution by the pilot is to first advise the instructor which station he is going to take a bearing on, then to take the bearing, and to proceed likewise with taking a bearing on the other station, and then by calculation to determine his own position relative to these two stations.

In the particular case assuming that the pilot undertakes to take a bearing on the Miami station MM which is indicated in Figure 15 at 211. According to the extended scale the instructor will set the flight course scale casing 95 so that the flight course scale will read 258°. Inasmuch as the pilot is headed at 320° the bearing observed by him will then be 62° or 118°. This is indicated in the readings of the flight course scale and azimuth indicator in the upper right hand portion of Figure 15. The pilot then calls the instructor by the inter-phone circuit and advises a bearing on KW (Key West) which is designated at 210 in Figure 15 of the drawings. The instructor then sets the flight course scale casing 95 so that the flight course scale with reference to the pointer 106 will indicate the reading which the tracer wheel on the map assumes with respect to station 210, which is 15°. The heading of the trainer is still 320°. The pilot's bearing on the azimuth indicator after the instructor has set the flight course scale for station 210 will then be 125° or 55°. By adding or subtracting these readings from the respective headings and placing them on his map, of which he has a duplicate in the trainer, the pilot can then locate himself by the intersection of the two lines from the two stations. The calculations are indicated in Figure 15. The instructor can then compare the pilot's map with his own in order to determine the accuracy of the bearings, or the pilot may repeat his bearings from the respective station and the instructor can record them on his map in order to determine the exact position from the plotted position.

As above indicated, in the solution of problems the azimuth scale reading is obtained by the pilot through the null point reached in the signal circuit after the instructor has set the flight course scale at its true bearing.

It should be noted that the problems described in Figures 14 and 15 do not necessarily apply to use with trainer adaptation. As to the problem in Figure 15, the use of two tuning units similar to those described on the automatic recorder and the azimuth indicator, without necessarily using the transformer unit attached to an automatic recorder, may be utilized. Problems may be solved by setting on the instructor's tuning unit settings which may be worked out ahead of the actual instruction time and tabulated for use in the student instruction operation.

A problem such as presented in Figure 15 may be changed to include the instruction of ground personnel or fixed station personnel, in the art of taking bearings and determining fixes on mobile stations or remote fixed stations. In such cases the instructor will have a pair of tuning units similar to the transformers above described for each student, representing some pre-selected ground station point. A group of stations may take a bearing on the same station at the same time without interference with each other. In the set-up shown in Figure 15 a student at station 211 and a student at station 210 may take bearings at the same time providing the instructor has a separate tuning unit for each station. By communicating the bearings to each other an exact fix may be determined by plotting the bearings on a map. Such instruction is of particular advantage to dispatchers in aircraft work and to compass station personnel on the ground.

Referring to Figures 1, 3, 4 and 5 of the drawings, mechanism is therein illustrated in association with the flight course scale casing of an automatic recorder for rendering positioning of the flight course scale fully automatic. With this arrangement the compass or bearings taken at all times will be exact without the necessity of the instructor resetting the flight course scale.

The operation of the automatic flight course scale resetting device, indicated at M is as follows: A supporting arm 250 is mounted upon a suitable standard 251. It may be positioned upon the instructor's desk, as shown in Figure 1, and is horizontally positioned over the desk. At its outer end it is provided with a pivot point or axis member 252 on which a channel-shaped track 253 is pivotally mounted and horizontally positioned. Fixed to the flight course scale housing 95 are diametrically opposed vertically positioned arms or standards 254 and 255, which at their upper ends slidably fit in the downwardly facing channel of the guide member 253. For correct operation, the axial point 252 must be located directly over the station on the map located on the instructor's table. As the automatic recorder moves over the map responsive to pilot's actuation of the trainer the track 253 will rotate on the axis 252 around the station and at any time will represent a radial line with reference to the map. The bearings taken by the pilot will be correctly set up at any instant by virtue of the movement of the guide member 253 responsive to automatic recorder actuation, due to the slidable connection of the standards 254 and 255 in the track 253. With this apparatus the instructor need only observe the course of the automatic recorder and to correct for the proper signal intensities relative to distance from the station, and to the proper course signal identification. With this arrangement of course the fixed reference pointer must be removed from the automatic recorder.

We wish it to be distinctly understood that while the direction finding characteristics of this invention are shown as related to a trainer, they may be used entirely independent of a trainer, and a signal source other than that usually used with a "Link" trainer may be used. The invention so far as the electrical hook-up with the variable coupling transformers is concerned may be used for radio navigation instruction, and other demonstrating and instructing purposes.

Various changes in the structural features of this invention, the rearrangement thereof, and changes made to the circuit and application of the structure of the invention, as well as changes in the modes and methods of construction may be made to the invention as herein shown and described, without departing from the spirit of the invention or the scope of the claims.

We claim:

1. An apparatus for instructing and training in flying by radio navigation comprising a grounded trainer controllable as to direction, means remote from the trainer for indicating the assumed bearing of the trainer with respect to a simulated broadcasting station position, means in said trainer for receiving signals simulating loop-antenna-received radio signals as received by the loop antenna of an aircraft in actual flight, means for creating and transmitting such signals of an intensity variable in accordance with the assumed bearing of the trainer with respect to the broadcasting station position, means in said creating and transmitting means for varying the intensity of said signals according to the assumed heading of the trainer, means in said signal receiving means in the trainer for tuning the intensity of the signals received, and azimuth indicating means in said trainer connected to said tuning means and operable therewith.

2. An electrical signalling apparatus for instruction in the art of navigation by means of radio comprising a trainer having a receiving station, means at said receiving station for aurally receiving signals, a transmitting station, means at said transmitting station for creating and transmitting to the receiving station signals simulating signals from a real transmitting or broadcasting station, means for transmitting said signals according to the assumed bearing of the trainer from the radio station being simulated, and means in the trainer for determining the assumed bearing from the trainer of the location of the real station whose signals are being simulated, said means comprising a visual bearing indicator and means for controlling the intensity of the signals received and a single control for operating both the indicator and signal intensity controlling means.

3. An electrical signalling apparatus for radio navigational instruction in training devices comprising a receiving station in the training device including an azimuth scale and a pointer movable over said azimuth scale, an electrical transmitting signal source remote from the receiving station and under the operation of an instructor for the transmission of signals varying in intensity according to the assumed direction of the training device with respect to a simulated radio transmitting station position, and an electroresponsive aural signal receiving means at the receiving station, said electroresponsive signal receiving means being connected with the signal transmitting means for receiving signals therefrom and including means for changing the intensity of the signals emitted by the receiving means operatively connected with the pointer, and means connected to the pointer and signal intensity changing means in the receiver for enabling the student to simultaneously tune the intensity of the signal received to the maximum or null intensity of the signal from said transmitting means and change the position of the pointer.

4. An apparatus for instruction and training in flight by radio comprising a trainer controlable as to direction, means in said trainer for aurally receiving signals simulating radio signals broadcast to airplanes in actual flight, an azimuth indicator in said trainer having a scale and a pointer, the pointer being operatively connected to said signal receiving means for varying the intensity of the signals as it is rotated over the scale, and means for creating and transmitting signals to said receiving means in accordance with the assumed bearing of the trainer from the location of the real radio station being simulated by varying the intensity of such signals.

5. An apparatus for the instruction of radio aerial navigation comprising a ground trainer having means for directional control thereof, an automatic recorder remote from the trainer and movable over a chart having a point thereon designating the position of a radio transmitting station, said recorder having means of forward movement and means responsive to directional control movement of the trainer for indicating the assumed path of travel of the trainer, electrical signal transmitting means remote from the trainer, electrical signal receiving means in the trainer for aurally receiving the signal of the transmitting means, said receiving means including tuning means for changing the intensity of the signals received by said receiving means, means connected with the recorder for varying the intensity of the transmitted signal in accordance with the direction of the recorder relative to the point representing the radio station, a bearing indicating instrument in the trainer connected with the tuning means in said signal receiving means, and a control in the trainer for tuning the intensity of the signal received to maximum or null intensity and simultaneously changing the reading of said bearing indicating instrument.

6. In an electrical signalling system for the instruction of radio navigation the combination of an electrical signal transmitting source, an aural signal receiver, a variable coupling transformer connected with the signal transmitting station, means for operating said transformer for varying the intensity of the signal transmitted, a variable coupling transformer connected with said signal receiver, means for operating said last mentioned transformer for varying the intensity of the signal emitted by said receiver, and means wiring the variable coupling transformers of said transmitting and receiving stations.

7. In an electrical signalling system for the instruction of radio navigation the combination of an electrical signal transmitting source, an aural signal receiver, a variable coupling transformer connected with the signal transmitting station, means for operating said transformer for varying the intensity of the signal transmitted, a variable coupling transformer connected with said signal receiver, means for operating said last mentioned transformer for varying the intensity of the signal emitted by said receiver, means wiring the variable coupling transformers of said transmitting and receiving stations, bearing indicating instrument means having a movable element connected with the variable transformer of the signal receiver, and a control for simultaneously operating the last mentioned variable transformer and movable element of the bearing indicating means.

8. The apparatus set forth in claim 2 in which means are also provided for changing the intensity of the signals received by the receiving means according to changes in the assumed heading of the trainer.

9. An electrical system for use in conjunction with grounded aviation trainers and the like for instructing students in navigation by radio comprising a trainer having a seat for a student, an aural signal receiver for use by a student in the seat, a visual indicator including azimuth indicating means arranged to be viewed by the student in the seat, an electrical transmitting signal source connected to said aural signal receiver through means for controlling the strength of the signals emitted by said signal receiver, and three separately operable means for operating the means for controlling the strength of the signals emitted by the signal receiver, at least one of said separately operable means being under the control of the student and connected to said azimuth indicating means to change the reading of the same simultaneously with operation of said separately operable means.

10. The structure set forth in claim 9 in which the second separately operable means is operated according to the assumed bearing of the trainer from a simulated radio transmitting station position.

11. The structure set forth in claim 10 in which the third separately operable means is operated according to the assumed heading of the trainer.

AHLERT P. STUHRMAN.
CHARLES W. McKEE.

(References on following page)

REFERENCES CITED

The following references are of record in the file of this patent:

UNITED STATES PATENTS

| Number | Name | Date |
|---|---|---|
| 1,123,795 | Pollen | Jan. 5, 1915 |
| 1,655,244 | Rowell | Jan. 3, 1928 |
| 1,825,462 | Link | Sept. 29, 1931 |
| 2,099,857 | Link | Nov. 23, 1937 |
| 2,110,869 | Crane | Mar. 15, 1938 |
| 2,119,083 | Link | May 31, 1938 |
| 2,119,530 | Dunmore | June 7, 1938 |
| 2,151,793 | Patin | Mar. 28, 1939 |
| 2,164,412 | Koster | July 4, 1939 |
| 2,171,561 | Hooven | Sept. 5, 1939 |
| 2,179,663 | Link | Nov. 14, 1939 |
| 2,226,726 | Kramer | Dec. 31, 1940 |
| 2,288,196 | Kramer | June 30, 1942 |
| 2,442,297 | Link | May 25, 1948 |

FOREIGN PATENTS

| Number | Country | Date |
|---|---|---|
| 476,816 | Great Britain | Dec. 16, 1937 |

OTHER REFERENCES

Air Corps News Letter, vol. 21, No. 6, March 15, 1938.

Aeronautics Bulletin No. 27, July 1, 1937.